US009984217B2

United States Patent
Mohamed (10) Patent No.: US 9,984,217 B2
(45) Date of Patent: May 29, 2018

(54) ELECTRONIC AUTHENTICATION OF AN ACCOUNT IN AN UNSECURE ENVIRONMENT

(71) Applicant: PAYPAL, INC., San Jose, CA (US)

(72) Inventor: Riaz Ebrahim Mohamed, Singapore (SG)

(73) Assignee: PayPal, Inc., San Jose, CA (US)

( * ) Notice: Subject to any disclaimer, the term of this patent is extended or adjusted under 35 U.S.C. 154(b) by 132 days.

(21) Appl. No.: 15/048,949

(22) Filed: Feb. 19, 2016

(65) Prior Publication Data

US 2017/0244683 A1   Aug. 24, 2017

(51) Int. Cl.
| | |
|---|---|
| *G06F 21/31* | (2013.01) |
| *H04L 29/06* | (2006.01) |
| *H04L 29/08* | (2006.01) |
| *H04L 12/58* | (2006.01) |
| *H04W 4/14* | (2009.01) |

(52) U.S. Cl.
CPC ............. *G06F 21/31* (2013.01); *H04L 51/22* (2013.01); *H04L 63/06* (2013.01); *H04L 63/083* (2013.01); *H04L 63/0838* (2013.01); *H04L 63/18* (2013.01); *H04L 67/02* (2013.01); *H04L 67/306* (2013.01); *H04W 4/14* (2013.01)

(58) Field of Classification Search
CPC ... G06F 21/31; H04L 63/083; H04L 63/0838; H04L 63/18
See application file for complete search history.

(56) References Cited

U.S. PATENT DOCUMENTS

| | | | | |
|---|---|---|---|---|
| 6,802,000 | B1 * | 10/2004 | Greene | G06F 21/6218 380/28 |
| 7,278,024 | B2 * | 10/2007 | Sundararajan | G06F 21/35 713/183 |
| 8,826,398 | B2 * | 9/2014 | Karp | G06F 21/6245 726/6 |
| 9,589,118 | B2 * | 3/2017 | Agarwal | G06F 21/31 |
| 2004/0181696 | A1 * | 9/2004 | Walker | G06F 21/31 726/6 |
| 2005/0238174 | A1 * | 10/2005 | Kreitzer | H04L 9/088 380/277 |
| 2006/0156385 | A1 * | 7/2006 | Chiviendacz | G06F 21/36 726/2 |
| 2007/0250920 | A1 * | 10/2007 | Lindsay | G06F 21/31 726/7 |
| 2008/0276098 | A1 * | 11/2008 | Florencio | G06F 21/46 713/183 |

(Continued)

*Primary Examiner* — James R Turchen
(74) *Attorney, Agent, or Firm* — Haynes & Boone, LLP (57) ABSTRACT

Systems and methods are provided for accessing a user account by a user with a first password, and then changing the first password to a second password in response to a request from the user without compromising the second password. The system may include a database in a server storing the first password and the second password. The server may provide the user access to the user account over a network connection in response to receiving the first password from the user. In response to the server receiving a request by the user, the server may disable the first password and activate the second password without requiring the user to provide the second password over the network connection at the time of the request.

20 Claims, 6 Drawing Sheets

(56) References Cited

U.S. PATENT DOCUMENTS

| | | | |
|---|---|---|---|
| 2009/0097459 A1* | 4/2009 | Jendbro | H04L 63/0838 370/338 |
| 2009/0125993 A1* | 5/2009 | Delia | G06F 21/35 726/6 |
| 2009/0170532 A1* | 7/2009 | Lee | H04M 1/72566 455/456.3 |
| 2009/0199294 A1* | 8/2009 | Schneider | G06F 21/316 726/18 |
| 2010/0100948 A1* | 4/2010 | Delia | G06F 21/31 726/6 |
| 2011/0026716 A1* | 2/2011 | Tang | G06F 21/43 380/284 |
| 2012/0054826 A1* | 3/2012 | Asim | G06F 21/6245 726/1 |
| 2013/0086655 A1* | 4/2013 | Karp | G06F 21/45 726/6 |
| 2014/0201844 A1* | 7/2014 | Buck | G06F 21/50 726/26 |

* cited by examiner

ELECTRONIC AUTHENTICATION OF AN ACCOUNT IN AN UNSECURE ENVIRONMENT

BACKGROUND

The present application relates to electronic authentication and more specifically to electronically authenticating an account in an unsecure environment.

Public access to the Internet is widely available in many public settings such as coffee shops, hotel lobbies, and bookstores, to name a few. Some of these network connections can be vulnerable to hackers accessing another user's network connection to steal private information. For example, a user may log in a bank account over the public Internet connection by entering the username and password associated with the user's account. A hacker may also be on the same network attempting to steal the user's password because the network may be unsecure. Even if the network is secure the user may still be vulnerable to getting his password stolen by the hacker. In other situations, somebody may physically peek over the user's shoulder as the user enters his password on a computing device, such as a laptop, tablet or smart phone. Thus, even if precautionary measures are taken by the user, there is some degree of risk by attempting to access an account in a public setting.

In some situations, a user may utilize a public computer, such as at a library or at a business center in a hotel. Such a public computer can be infected with keystroke loggers where keystrokes entered by the user are recorded and secretly provided to a hacker. Thus, the user risks compromising his password to a hacker. However, given the risks of being in a public setting, users may still have a reason to access their account from the public setting. For example, one may urgently need to pay a bill or transfer money before a due date. Thus, a method of safely accessing a user account over a network in a public setting is desirable.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts. In the drawings, the relative sizes of elements, layers, and regions may be exaggerated for clarity.

The present disclosure is directed to systems and methods that allow users to access their accounts over a network connection without worrying that somebody may steal their password or their account may be accessed by unauthorized users. One way to overcome this concern is by changing the password whenever the user believes that his password has been compromised. However, if the user changes the password by typing in the new password over the same unsecure or untrusted network connection, then the user risks compromising the new password again. Furthermore, if another user (e.g., a hacker) can visually see the user typing the new password on the computer keyboard or virtual keyboard, the user may risk compromising his new password again. The various embodiments of the present disclosure provide methods to safely change the password in such unsecure and untrusted settings, without compromising the new password. Herein the present disclosure, examples of unsecure or untrusted network connections may include unencrypted Wi-Fi connections, unencrypted hotspots, etc.

In one aspect of an embodiment, an active password and an inactive password is stored on a server associated with the user account. The active password allows the user to log on to the user account from a computing device. If the user suspects that he is in a situation where the active password has been compromised (e.g., by using the computing device from a vulnerable unsecure setting) by a hacker, the user can initiate an "emergency mode" from the computing device to instantly disable the currently active password and enable the inactive password to become the new active password. Furthermore, the inactive password is already stored on the server associated with the user account well before the user accesses his user account from the vulnerable setting. Thus, when the user initiates the emergency mode, the user does not have to enter a new password (i.e., the inactive password) into the computing device. Consequently, the hacker is unable to steal the new password and the user is able to quickly change his password from the computing device, even while still in the vulnerable setting.

In another aspect of an embodiment, the inactive password may be created by the user. Yet, in another aspect, the inactive password may be generated by a computer (e.g., a server).

Figure 1:
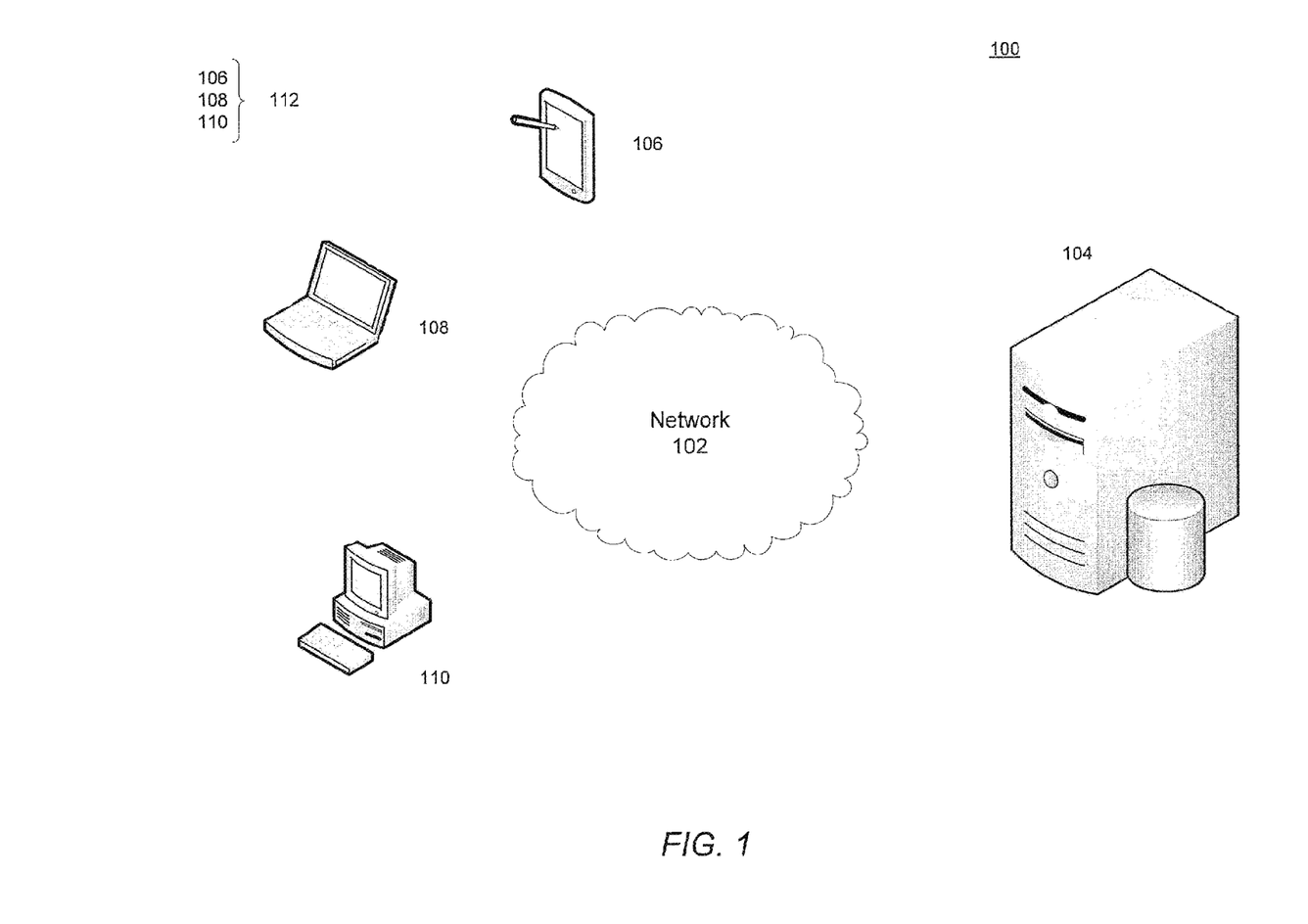
FIG. 1 is an exemplary block diagram of a networked system suitable for implementing the processes described here, according to an embodiment.

FIG. 1 is a block diagram illustrating an example arrangement of client terminals 112 connected to a server 104 over a network 102. By way of example and not of limitation, the client terminals 112 include a tablet 106, a laptop computer 108, and a desktop computer 110. However, the client terminals 112 may also include other electronic devices, instead of and/or in addition to those shown here, such as smart phones.

The server 104 is associated with the user account of the institution in which the account belongs, for example, a bank and payment service providers such as PAYPAL®. In some embodiments, information such as a username and/or password pertaining to the user account is located on the server 104, which will be provided in more detail later. Thus, a user who wishes to access his account located on the server 104 may utilize any one or more of the client terminals 112 to log in to the account over the network 102. As illustrated in FIG. 1, each of the client terminals 112 may be connected to the network via various methods, such as a private home network connected to Internet service (e.g., cable modem, DSL, etc.) or a public network (e.g., coffee shop, library, hotel, etc.) connected to the Internet.

Figure 2:
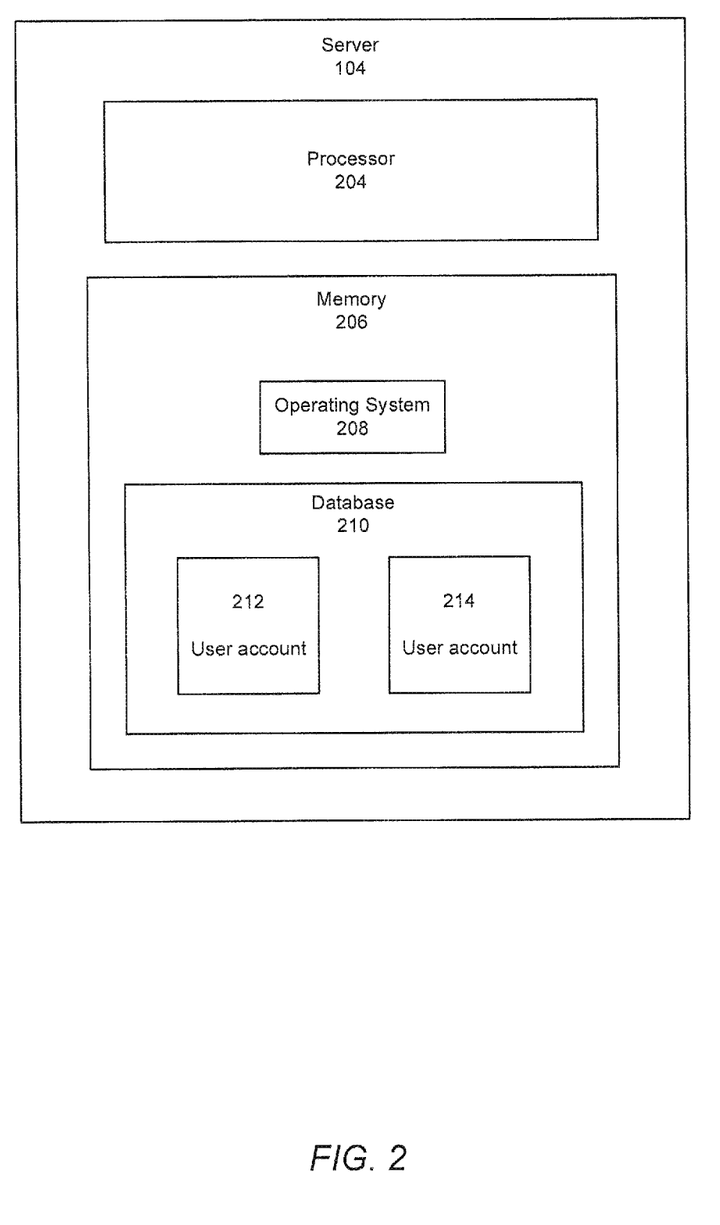
FIG. 2 is an exemplary block diagram of the server illustrated in FIG. 1, according to an embodiment.

FIG. 2 is an exemplary block diagram of the server 104 illustrated in FIG. 1, shown in more detail. In some embodiments, the server 104 includes a hardware processor 204, a non-transitory memory 206 and a database 210.

The hardware processor 204 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein and discussed in more detail below. The hardware processor 204 may also be implemented as a combination of computing devices, e.g., a combination of a DSP and a microprocessor, a plurality of microprocessors, one or more microprocessors in conjunction with a DSP core, or any other such configuration. The hardware processor 204 may be a single processor or multiple processors, where each processor may have one or more processing cores capable of parallel and/or sequential operation.

The non-transitory memory 206 may include a cache memory (e.g., a cache memory of the processor 206), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the non-transitory memory 206 includes a non-transitory computer-readable medium.

The non-transitory memory 206 may store instructions that, when executed by the hardware processor 204, cause the hardware processor 204 or a system that includes the hardware processor 204 to perform the operations described herein in connection with embodiments of the present disclosure. Instructions may also be referred to as code. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements. In some embodiments, the memory 206 may include an operating system 208, such as WINDOWS® or LINUX® operating systems. Yet in some embodiments, the non-transitory memory 206 may include a database 210 for storing information (e.g., name, address, phone number, etc.) for the user accounts 212, 214. FIG. 2 shows that the database 210 stores a password for the first user 212, and a password for a second user 214. Furthermore, the database may store a second password for the first user 212 and a second password for the second user 214. The database 210 may also store other information that may not be necessary for the understanding of the embodiments of the present disclosure, and thus are omitted.

In some embodiments, a user may access the user account 212 stored in the database 210 on the server 104 by utilizing, for example, a laptop computer 108 connected to a wireless network at a coffee shop. The laptop computer 108 may have applications such as a web browser (e.g., CHROME® or INTERNET EXPLORER®) and the user may visit the website associated with the account provider (e.g., bank or payment provider) and enter his username and password. In doing so, the user invokes the hardware processor 204 in the server 104 to give the user access to their account 212.

Figure 3:
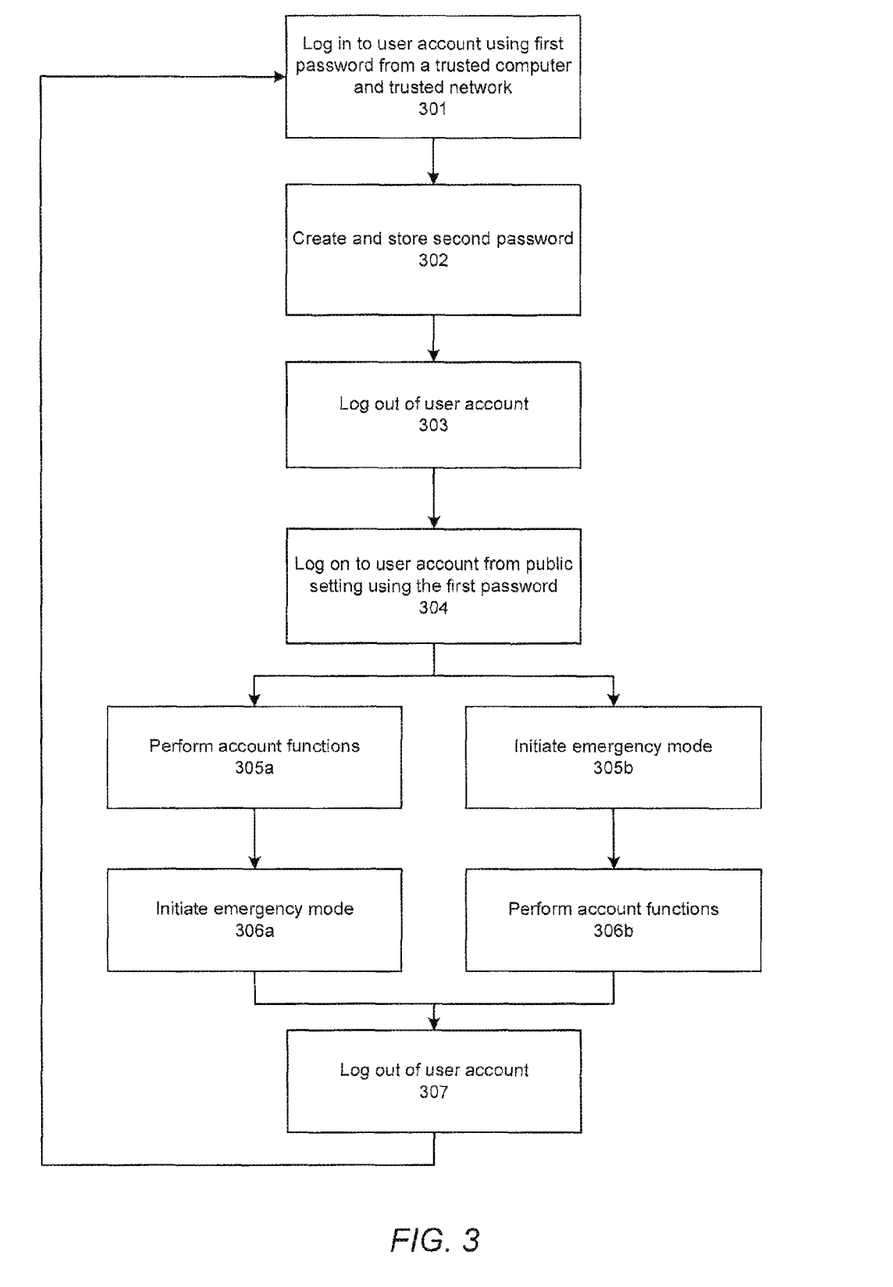
FIG. 3 is a flowchart of an exemplary process for accessing a user account on a server and changing its password over an unsecure network, according to an embodiment.

FIG. 3 is an exemplary flowchart explaining the method for a user accessing an account over a network connection according to an embodiment of the present disclosure. In the present disclosure, it may be assumed that the user has an account at a bank and the user is able to remotely access the user's bank account over the Internet by visiting the bank's website using a web browser from a personal computing device and entering the username and the password. By accessing the user's bank account, the user is able to perform a number of functions such as, for example, transfer funds from one account to another, transfer funds from one bank to another bank, and/or pay bills. A bank account is mentioned herein the present disclosure as one example of an "account." However, the account may be any type of account, such as, for example, a cell phone account, a utility account, or financial institution accounts such as PAYPAL®, that are accessible via a client terminal. A further assumption may be made that the user has the username and the password associated with his account, which the user needs to gain access to the account.

According to an embodiment, the user initially accesses the account (e.g., logging in) by entering the username and the password from a trusted client terminal and a trusted network connection, for example, a personal computer connected to the Internet from a private home network (301). A "trusted network connection" as used in the present disclosure refers to, for example, a private home or business wired network, or a wireless network that is secured with encryption. A "trusted client terminal" as used in the present disclosure refers to, for example, a client terminal in which the user believes is not infected with any malware or virus, such as those that can capture the user's keystrokes.

At step (302), the user's account is initially set up by creating a second password for the account after the user accesses the account over the Internet. The second password may also be referred to as an "inactive password" or a "backup password," and the terms may be used interchangeably. The second password is also associated with the same user account and stored on the server. However, the second password is in an inactive state. That is, the second password cannot be used to access the account until the second password is activated (e.g., enabled) by the server. Once the user's account is set up with two passwords, the first (active) password and the second (inactive) password, the user may now log out of the account (303). Thus, according to an embodiment of the present disclosure, the user can initiate an "emergency mode" to cause the server to change the password at some later point in time, for example when the user is accessing the account in a public setting.

At step (304), the user uses a personal computing device connected to a public wireless network in a public setting, for example, at a coffee shop. In some situations, the Wi-Fi connection may be an unsecure (e.g., unencrypted) connection and a hacker may be present on the network attempting to steal the user's password. In some situations, the Wi-Fi connection may be a secure (e.g., encrypted) connection, but the coffee shop may be crowded with many people and the people sitting near the user's computer may be able to steal the user's password by visually watching the user enter the password on the computing device. Even though the user is aware that there are risks of compromising his password by accessing his account in a public setting, the user logs in to his account by entering the first password on the computing device. In doing so, the first password is transmitted over the Internet to the server of the bank, where the processor at the server determines that the user may be granted access to the account if the first password received from the user matches the first password that is stored in the database of the server. Once the user is granted access, the user may execute any desired function (e.g., transfer funds, pay bills) while logged into the account (305a).

Because the user has identified the risks associated with accessing the account in the public setting, the user is afraid that the first password may be compromised by a hacker either when the user entered the first password into the computing device or when the first password was transmitted over the Internet to the server. According to an embodiment of the present disclosure, the user initiates "emergency mode" to cause the server to disable the first password and activate the second password (306a). In some embodiments, the first password may be disabled and the second password may be activated concurrently. In other embodiments, the first password may be disabled before the second password is activated. The user may then log off (307) and does not have to be concerned that a hacker may know his password because the active password has now been changed to the second password.

In some embodiments, the emergency mode may be initiated by actuating (e.g., clicking) an icon in the browser while the user is still logged into the account. When the user actuates the emergency mode icon, the server receives a request to disable the first password, and activate the second password. That is, the user has previously set up the account (e.g., from home or other secure setting) with the second password before the user accessed the account from the public setting. Thus, when the user actuates the emergency mode icon, the user does not enter (e.g., type) the second password on the computer in the public setting, and therefore the second password is not transmitted over the public network (e.g., the Wi-Fi connection at the coffee shop). Furthermore, because the password is not entered from the public setting, there is no concern of people visually seeing the user typing a new password on the computing device. Thus, by clicking a single icon on the computer, the user is able to disable the potentially compromised first password and activate the uncompromised second password.

In one embodiment, the "emergency mode" icon is always present with the user's account display when the user has set up the emergency mode function. In another embodiment, the "emergency mode" icon is only displayed when the system detects the user is in a public location, in an unsecure area, in a location that is densely populated, especially with other users who are known hackers, or in a location where the user may want to utilize the emergency mode function. These types of determinations can be made through devices at the location through a location determining device such as, for example, a global positioning system (GPS), cellular tower triangulation system, internet protocol (IP) address location system, etc., in the various computing devices, along with knowledge of the device and corresponding user. In yet another embodiment, the "emergency mode" icon is only displayed when the device detects one or more other people behind or near the user, such as through location detection and/or a proximity sensor such as, for example, a front facing camera or an infrared sensor, of the user computing device. This may be valuable because the user may not realize someone is behind the user and maybe looking over his shoulder.

In some embodiments, the user may first perform all of the functions (305a) that the user desires to perform while logged-in, and then initiate the emergency mode (306a) after the user is finished with performing all of the functions but before logging out of the account. This way, the user can be sure that he no longer needs the first password.

In another embodiment, the user may initiate the emergency mode immediately after accessing the user account (i.e., before executing account functions) (305b) to reduce the amount of time in available to the hacker to access the user's account using the stolen password. Again, the emergency mode icon may be actuated on the computer to disable the first password and activate the second password. Because the hacker does not have the activated second password, the hacker is unable to access the user's account, and the user may now perform the desired functions within the account (e.g., transfer funds) (306b) without having a sense of urgency.

Performing some functions within the account may require that the user reenter the password (e.g., for confirmation or verification), even though the user may already be granted access and logged in. For example, while logged in to the bank account, the user may be able to view the account balance and update the profile without having to reenter the password, but other functions that may be construed as having a higher liability, such as transferring of funds, may require that the user reenter the password before executing the function (e.g., funds transfer). According to this embodiment, because the emergency mode has already been executed and the active password has already been changed to the second password, the user will now enter the second password. Thus, the user may again, risk compromising the new second password to a hacker.

According to another embodiment, the user may set up his account by repeating step (302) any number of times such that, in addition to creating and storing a second password (inactive password), the user may create a third password (inactive password) or even a plurality of inactive passwords. Thus, if the user suspects that his second password may be compromised after using the activated second password, the user may initiate the emergency mode a second time to change the second password to the third password, i.e., deactivate the second password and activate the third password.

After the emergency mode is initiated, the user's account may no longer have any more inactive password stored on the server associated with the user's account. In some embodiments, the user may access the account at a later time from a client terminal and a trusted network to create and store a new backup password by repeating step (301) and step (302). Therefore, the user will be able to initiate the emergency mode the next time he is in a situation where he suspects that his password may be compromised.

Figure 4:
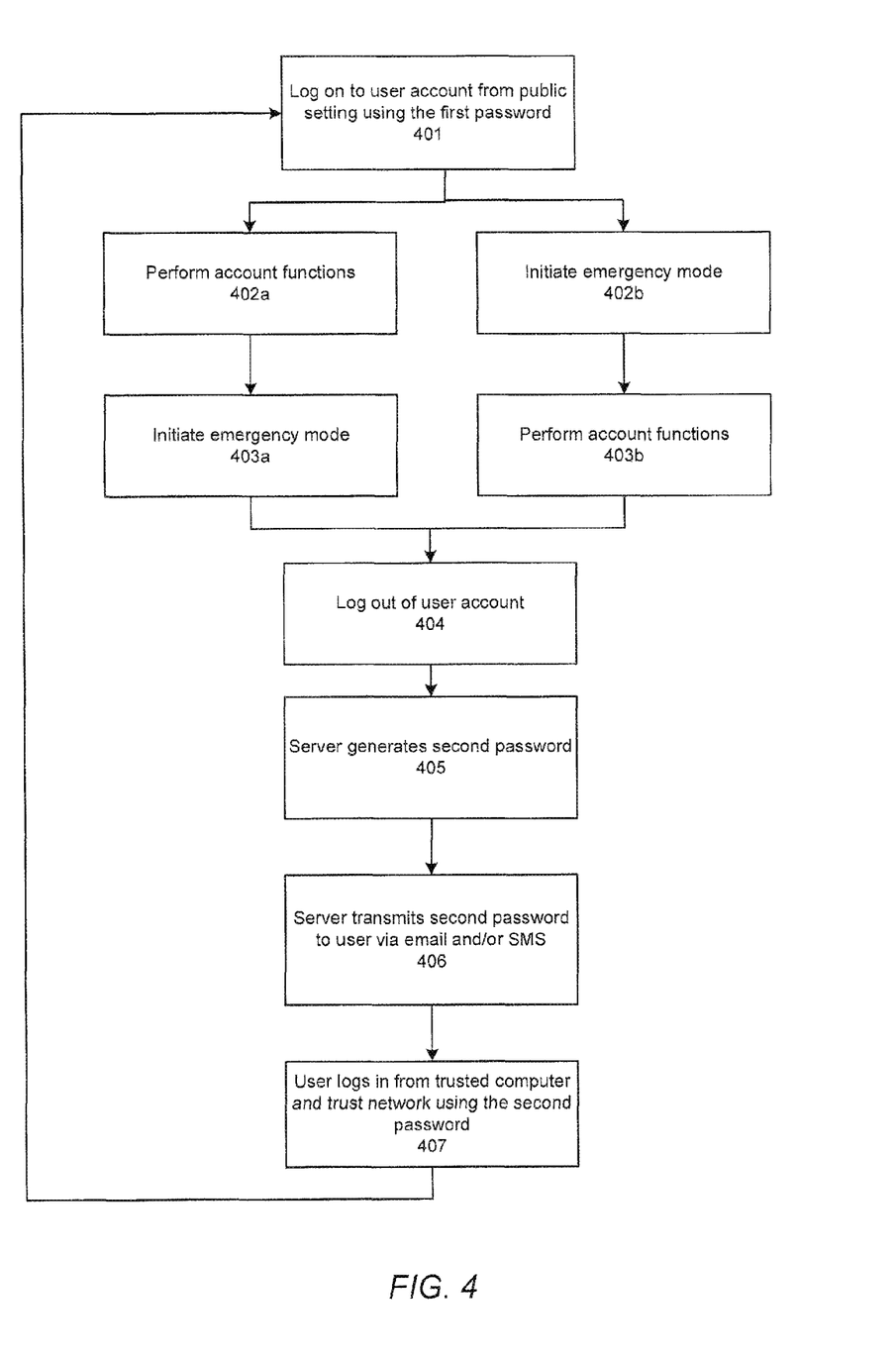
FIG. 4 is a flowchart of an exemplary process for accessing a user account on a server and changing its password over an unsecure network, according to another embodiment.

FIG. 4 is an exemplary flow chart explaining the method for a user accessing an account over a network connection, according to another embodiment of the present disclosure.

According to the exemplary embodiment, and differently from the embodiment illustrated in FIG. 3, the user is able to initiate the emergency mode without having to create and store a second password. Instead, the server is configured to generate the second password (e.g., the backup password) when the emergency mode is initiated.

At step (401), the user accesses his account from a personal computer in a public setting (e.g., connected to a public wireless network). Similarly to the process described in the embodiment illustrated in FIG. 3, the user performs a function while accessing his account (402a), and realizes that there is a risk of compromising his password to a hacker because he is in a public setting. According to an embodiment of the present disclosure, the user initiates the emergency mode by actuating (e.g., clicking) the emergency mode icon on a computer (403*a*). The request for initiating the emergency mode is transmitted to the server over the network, and the server disables the first password so that it can no longer be used to gain access to the user's account. Once the user initiates the emergency mode, the user may trust that even if the first password was compromised by a hacker, the first password is no longer valid for accessing the account. The user may then, if desired, log out of the account (404). Alternatively, if the user has more functions to perform, the user may remain logged in, and continue to perform more functions.

According to an embodiment of the present disclosure, when the emergency mode is initiated, in addition to the server disabling the first password, the server generates a new password (i.e., a new active password) (405) and transmits the new password to the user over a communication link such as, for example, email or short message service (SMS) text message to the user's mobile device (e.g., cell phone) (406). In some embodiments, the server splits the new password into portions and transmits the different portions of the password to the user over multiple communication links. For example, the serve may divide the password into two portions (e.g., a first half of a string of characters of the password and a second half of the string of characters of the password) and transmit the first portion to the user via email, and transmit the second portion to the user via SMS text message. This way, if the user's email or mobile device is compromised, the entire string of characters of the new password will not be revealed, thus not compromising access to the account (e.g., bank account). Once the user obtains the new password generated by the server, the user may now log in to the account again. Furthermore, if the user desires to create his own password, the user may access the account from a trusted computer on a trusted network and change the password.

Figure 5:
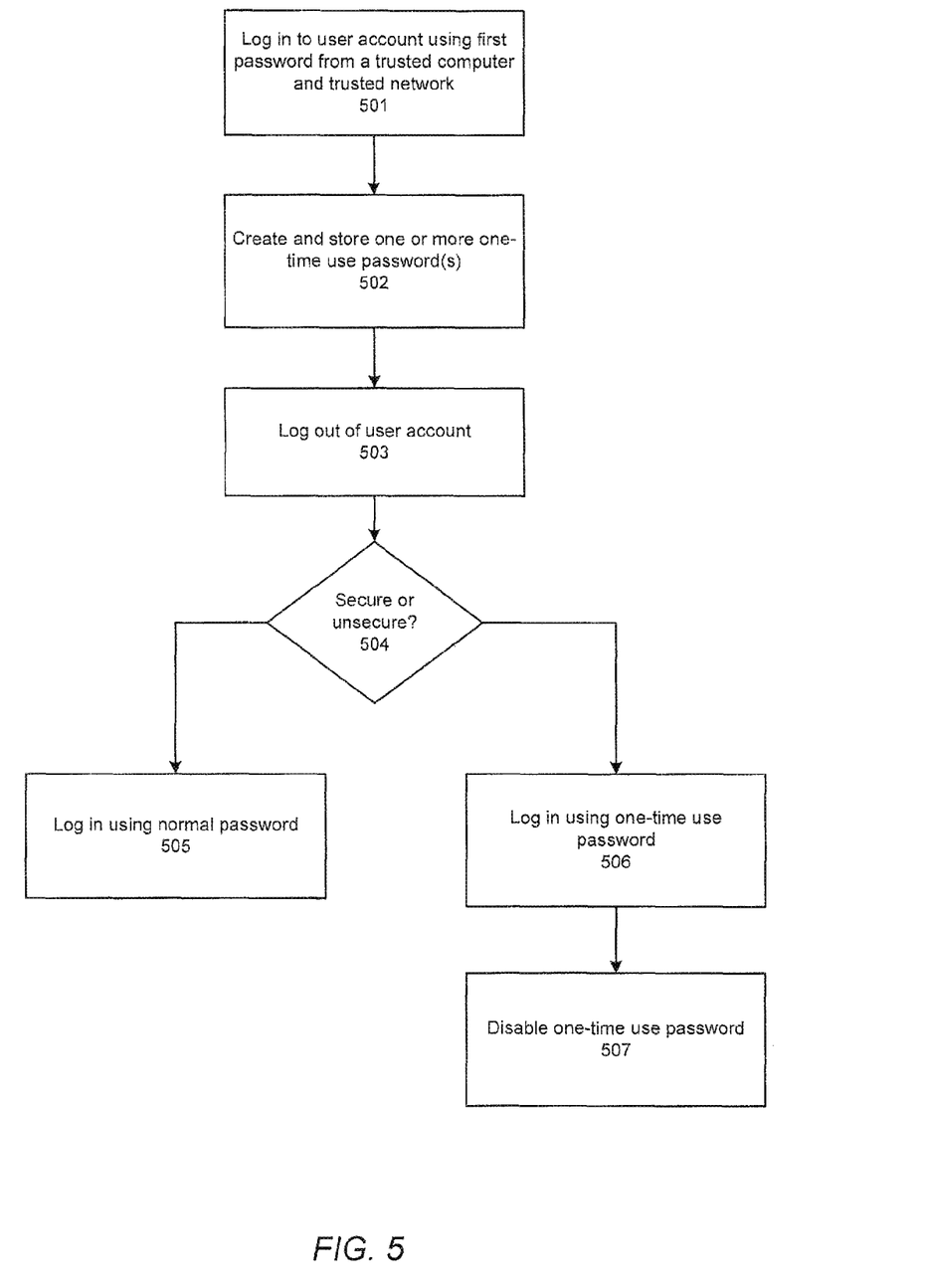
FIG. 5 is a flowchart of an exemplary process for accessing a user account on a server without compromising the account to a hacker, according to another embodiment.

FIG. 5 is an exemplary flow chart explaining the method for a user accessing a user account over a network connection, according to another embodiment of the present disclosure.

According to the exemplary embodiment, and differently from the embodiment illustrated in FIG. 3 or FIG. 4, the user is able to safely access the user's account from a computing device in a public setting without compromising access to his account to a hacker.

At step (501), the user initially accesses the account by logging in with the username and the password from a trusted client terminal and a trusted network connection, for example, a personal computing device connected to the Internet from a private home network. According to an embodiment, the user's account is first set up after the user accesses the account over the Internet by creating a second password for the account (502). The second password according to this embodiment may also be referred to as a "one-time use password." The one-time use password is an active password that is also associated with the same user account and stored on the server, but differently from the first password, where the one-time use password may only be used to access the account one time. Once the one-time use password is used, the one-time use password is disabled (e.g., deactivated) by the server. Contrarily, the first password is a reusable password so the same first password may be used any number of times to access the account. Once the user's account is set up with two passwords, the first password, and the second (one-time use) password, and the user may now log out of the account (503).

Thus, according to an embodiment of the present disclosure, the user may choose to use either the first password or the second password to access the account depending on the user's situation at the time of accessing the account (504). If the user is using a trusted computer from a trusted network, then the user may use the first password to access the account (505). On the other hand, if the user is in a public setting, for example, using a personal computer over a public wireless network (e.g., Wi-Fi at a coffee shop) or using a publicly shared computer at a library (whether connected to a secure or unsecure network), the user may not trust the security of the computer or the network, and is afraid that the user's password may be compromised by a hacker, then the user may use the one-time use password to access the account (506). In this case, the user enters the one-time use password on the computing device and the one-time use password is transmitted to the server where the server grants the user access to the account. Once the one-time use password is used, the one-time use password is disabled by the server (507) so that it cannot be used by anybody else to access the user's account.

While the exemplary embodiment describes processes for creating and storing one one-time use password, the embodiments of the present disclosure is not limited thereto. Instead, a multiple one-time use passwords may be stored on the server such that the user may safely access the account multiple times until the server no longer has any more one-time use password stored thereon.

While the above exemplary embodiments describe various systems and methods for accessing the account from personal computer or a personal computing device, the user may instead use any one or more of electronic client terminal devices such as the tablet 106, the laptop computer 108, or a desktop computer 110, as illustrated in FIG. 1, for example, or a smartphone (not shown). However, any one of the tablet 106, the laptop computer 108, and/or the desktop computer 110 may be utilized interchangeably as the client terminal 112, and the general workings of these client terminals 112 may be assumed to be substantially the same for the purposes of explaining the embodiments of the present disclosure.

Figure 6:
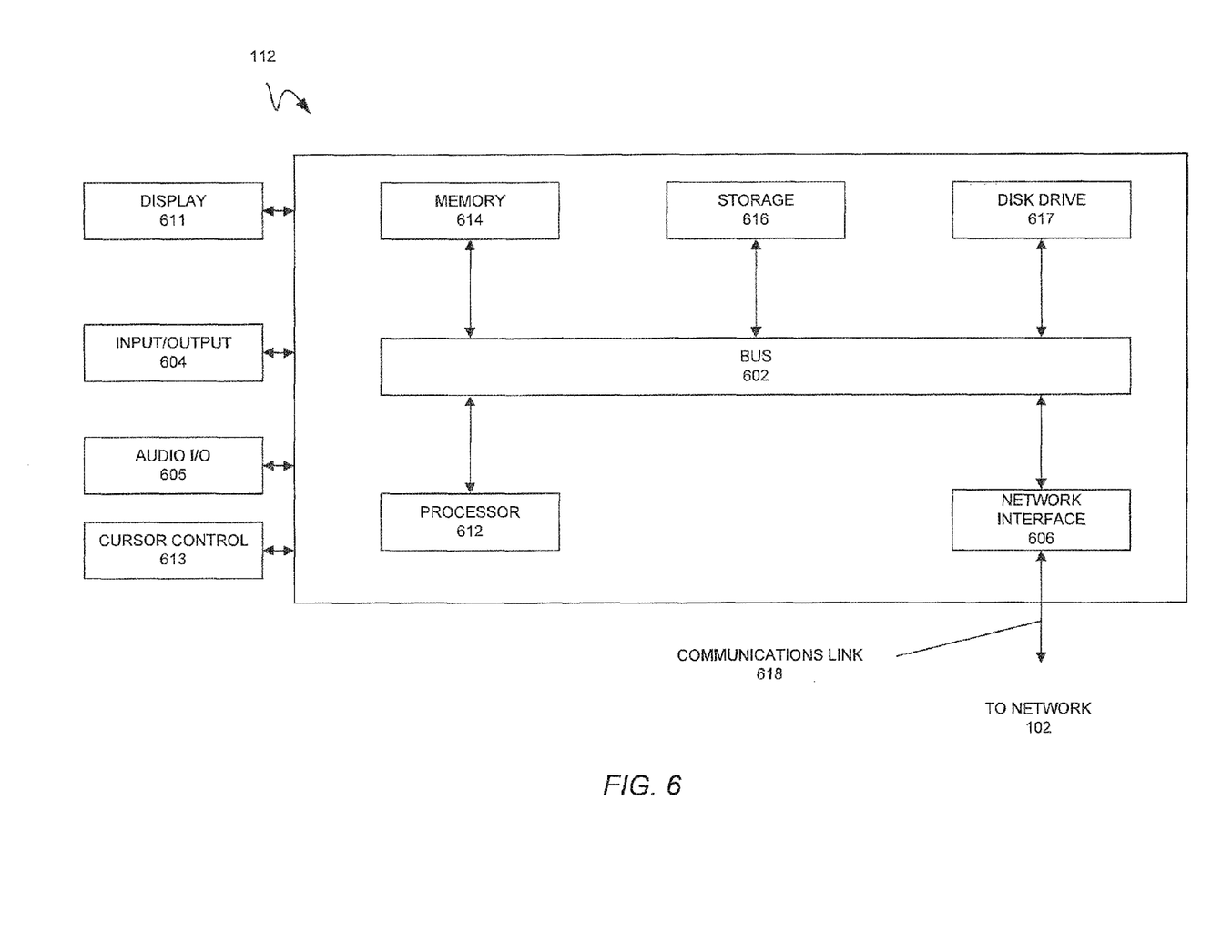
FIG. 6 is an exemplary block diagram of a client terminal illustrated in FIG. 1, according to an embodiment.

Accordingly, FIG. 6 illustrates an exemplary embodiment for implementing the client terminal 112 (e.g., the tablet 106, the laptop computer 108, the desktop computer 110, or a smart phone). In accordance with various embodiments of the present disclosure, client terminal 112, includes a bus 602 or other communication mechanism for communicating information, which interconnects subsystems and components, such as a processing component 612 (e.g., processor, micro-controller, digital signal processor (DSP), etc.), a system memory component 614 (e.g., RAM), a static storage component 616 (e.g., ROM), a disk drive component 617 (e.g., magnetic or optical), a network interface component 606 (e.g., modem or Ethernet card), a display component 611 (e.g., LCD or OLED), an input component 604 (e.g., keyboard, keypad, or virtual keyboard), and a cursor control component 613 (e.g., mouse, pointer, or trackball). In one implementation, the disk drive component 617 may comprise a database having one or more disk drive components.

In accordance with embodiments of the present disclosure, the client terminal 112 performs specific operations by the processor 612 executing one or more sequences of instructions contained in the memory component 614, such as described herein with respect to the client terminals 112. Such instructions may be read into the system memory component 614 from another computer readable medium, such as the static storage component 616 or the disk drive component 617. In other embodiments, hard-wired circuitry may be used in place of or in combination with software instructions to implement the present disclosure.

Logic may be encoded in a computer readable medium, which may refer to any medium that participates in providing instructions to the processor 612 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 617, volatile media includes dynamic memory, such as the system memory component 614, and transmission media includes coaxial cables, copper wire, and fiber optics, including wires that comprise the bus 602. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the client terminal 112. In various other embodiments of the present disclosure, a plurality of the client terminals 112 coupled by a communication link 618 to the network 102 (e.g., such as a LAN, WLAN, PTSN, and/or various other wired or wireless networks, including telecommunications, mobile, and cellular phone networks) may perform instruction sequences to practice the present disclosure in coordination with one another.

The client terminal 112 may transmit and receive messages, data, information and instructions, including one or more programs (i.e., application code) through the communication link 618 and the network interface component 606. The network interface component 606 may include an antenna, either separate or integrated, to enable transmission and reception via the communication link 618. Received program code may be executed by processor 612 as received and/or stored in disk drive component 610 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

It will be understood that, although the terms "first," "second," "third," etc., may be used herein to describe various elements, regions, and/or sections, these elements, regions, and/or sections should not be limited by these terms. These terms are used to distinguish one element, region, or section from another element, region, or section. Thus, a first element, region, or section described below could be termed a second element, region, or section, without departing from the spirit and scope of the present invention.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the tem "exemplary" is intended to refer to an example or illustration.

Unless otherwise defined, all terms (including technical and scientific terms) used herein have the same meaning as commonly understood by one of ordinary skill in the art to which the present invention pertains. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims and their equivalents.

The invention claimed is:

1. A system, comprising:
a non-transitory memory; and
one or more hardware processors coupled to the non-transitory memory and configured to read instructions from the non-transitory memory to cause the system to perform operations comprising:
providing an active password associated with a user account stored in a database of a server, the active password being a first password, and when inputted by the user, gives the user access to the user account;
receiving, via a network connection, the active password from a computing device to give the user access to the user account;
determining that the network connection is unsecure;
responsive to the determining, causing an emergency mode actuator to be presented to the user; and
upon receiving a selection of the emergency mode actuator, deactivating the first password and setting a second password, stored in the database of the server as an inactive password associated with the user account, as the active password without requiring the user to input the second password when setting the second password as the active password.

2. The system of claim 1, further comprising a user interface comprising the emergency mode actuator, wherein the user initiates the deactivating of the first password and the setting of the second password as the active password by actuating the emergency mode actuator.

3. The system of claim 2, further comprising a location determining device, wherein the operations further comprise displaying the emergency mode actuator in response to indication by the location determining device that the user is in a first type of environment.

4. The system of claim 2, further comprising a proximity sensor, wherein the operations further comprise displaying the emergency mode actuator in response to indication by the proximity sensor that one or more other people are within a first distance to the user.

5. The system of claim 2, wherein the user interface is a mobile app on a mobile device or a web browser on a computer.

6. The system of claim 1, wherein the second password is created by the user at a different point in time.

7. The system of claim 1, wherein the user account is an account associated with a payment service provider.

8. The system of claim 1, wherein the deactivating the first password and the setting the second password as the active password are performed concurrently.

9. A method for providing account access in an unsecure environment, the method comprising:
providing to a user, access to a user account over a network connection, in response to a server receiving a first password provided by the user over the network connection, wherein the first password is associated with the user account in a database of the server and is an active password such that when inputted by the user from a user interface, the server provides access to the user account;
determining, by the server, that the network connection is unsecure;
responsive to the determining, causing an emergency mode actuator to be presented to the user; and
disabling by the server, the first password, and setting by the server, a second password, associated with the user account and stored the database of the server as an inactive password, as the active password, in response to the server receiving a selection of the emergency mode actuator by the user over the network connection without requiring the user to provide the second password over the network connection at a time of the selection.

10. The method of claim 9, wherein the second password is created by the user from a secure environment before providing access to the user account in the unsecure environment.

11. The method of claim 9, wherein the second password is a computer generated password generated by a hardware processor coupled to a non-transitory memory of the server.

12. The method of claim 11, wherein the computer generated password is generated after the selection by the user.

13. The method of claim 11, wherein the computer generated password is generated when the user account is created.

14. The method of claim 11, further comprising sending the computer generated password to the user via an email or an SMS test message, in response to the selection by the user.

15. The method of claim 14, further comprising sending a first portion of the computer generated password to the user via email and sending a second portion of the computer generated password to the user via SMS.

16. A non-transitory machine-readable medium having stored thereon machine-readable instructions executable to cause a machine to perform operations comprising:
providing to a user, access to a user account over a network connection, in response to a server receiving a first password provided by the user over the network connection, wherein the first password is associated with the user account in a database of the server and is an active password such that when inputted by the user from a user interface, the server provides access to the user account;
determining, by the server, that the network connection is unsecure;
responsive to the determining, causing an emergency mode actuator to be presented to the user; and
disabling by the server, the first password, and setting by the server, a second password, associated with the user account and stored the database of the server as an inactive password, as the active password, in response to the server receiving a selection of the emergency mode actuator by the user over the network connection without requiring the user to provide the second password over the network connection at a time of the selection.

17. The non-transitory machine-readable medium of claim 16, wherein the second password is created by the user from a secure environment before providing access to the user account over the unsecure network connection.

18. The non-transitory machine-readable medium of claim 16, wherein the second password is a computer generated password generated by a hardware processor coupled to a non-transitory memory of the server.

19. The non-transitory machine-readable medium of claim 18, wherein the operations further comprise sending the computer generated password to the user via email or SMS text message, in response to the selection by the user.

20. The non-transitory machine-readable medium of claim 19, wherein the operations further comprise sending a first portion of the computer generated password to the user via email and sending a second portion of the compute generated password to the user via SMS.

\* \* \* \* \*